June 18, 1946.   H. H. HARPSTER   2,402,398
BOOSTER PUMP FOR AIRCRAFT FUEL SYSTEMS
Filed May 29, 1943   3 Sheets-Sheet 3
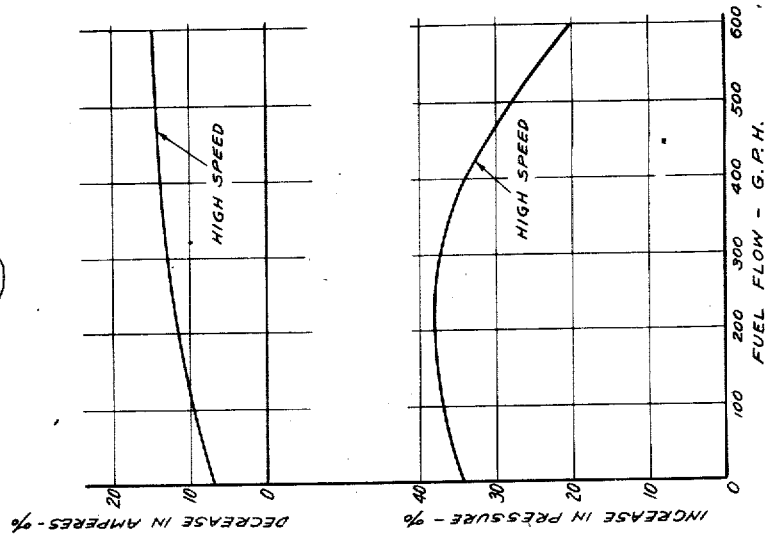
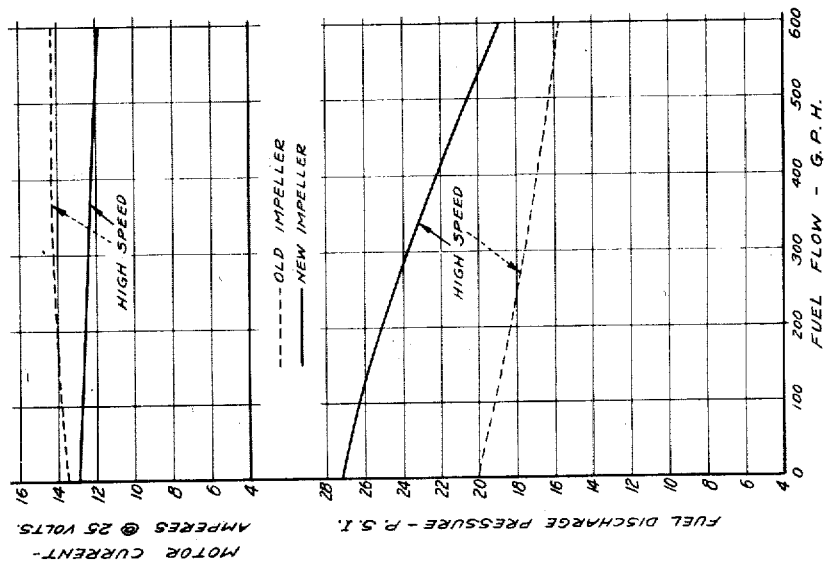
Inventor:
Harry H. Harpster
By: Edward C. Fitzbaugh Patented June 18, 1946

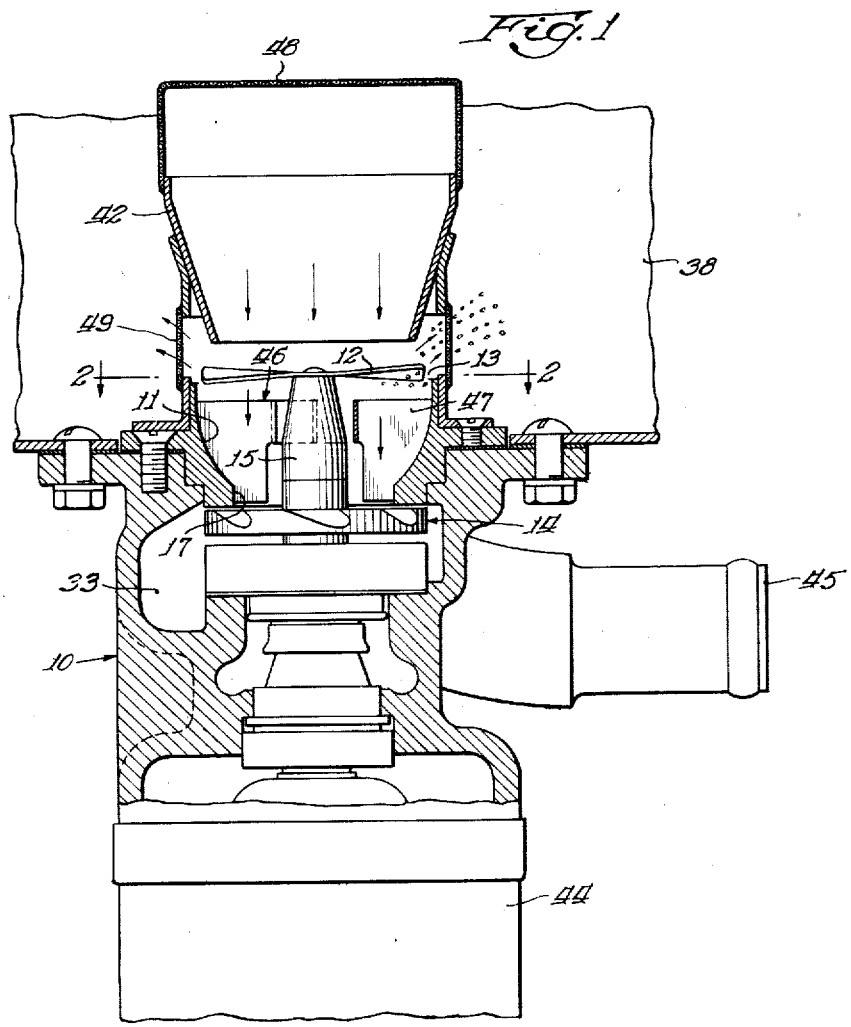

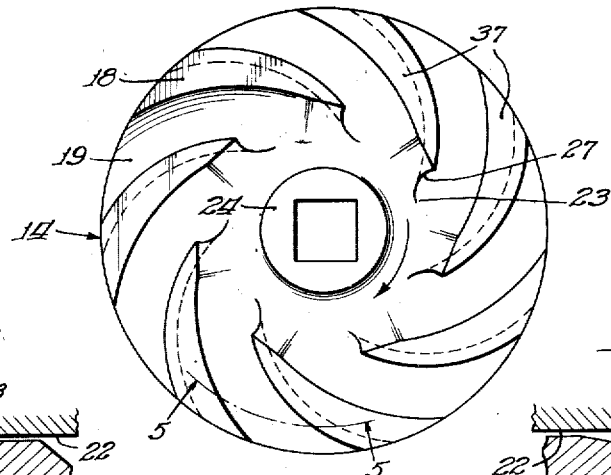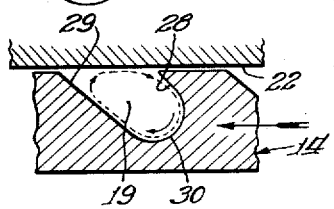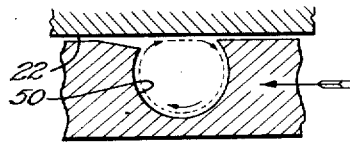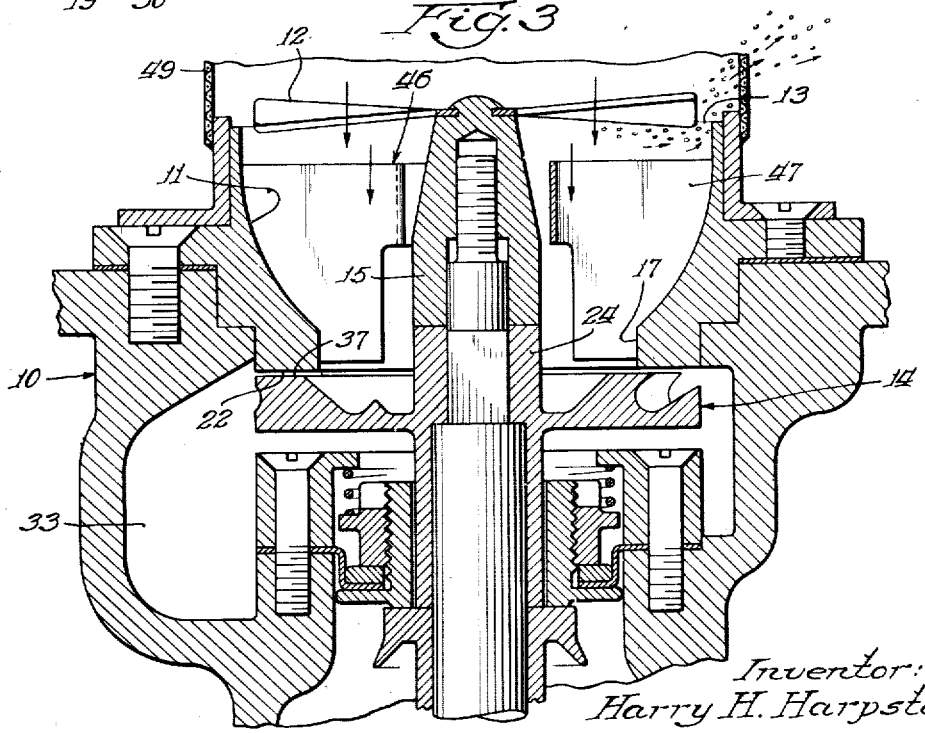

2,402,398

UNITED STATES PATENT OFFICE 2,402,398

BOOSTER PUMP FOR AIRCRAFT FUEL SYSTEMS

Harry H. Harpster, Cleveland, Ohio, assignor to Pesco Products Co., a corporation of Ohio Application May 29, 1943, Serial No. 488,972

18 Claims. (Cl. 103—113)

My invention relates to centrifugal booster pumps and particularly to an improved form and arrangement of elements for ejecting occluded air bubbles, reducing the power input and raising the pressure differential.

The invention has as its broad object the provision of an improved construction of centrifugal pump housing and centrifugal impeller therein, incorporating a new and novel mode of coaction between the housing, the impeller and the fluid moved thereby.

It is a further object to provide an improved centrifugal booster pump assembly particularly adapted for handling high volatile liquid fuel at widely differing altitudes. More particularly it is an object to provide a centrifugal booster pump assembly effective to produce the maximum pressure boost between inlet and outlet with the minimum required power input, minimum turbulence and minimum vapor inclusion.

A further object is to provide an improved combination of vapor eliminating propeller, converging inlet throat construction and centrifugal impeller effective to produce the above results.

Another more particular object is the provision of a novel combination of inlet throat arrangement and cooperating centrifugal impeller structure whereby to increase the effectiveness with which volatile liquid fuel is moved through the pump. More specifically it is an object to so construct and arrange the housing surface about the inlet throat in opposed relation to a specially constructed impeller to impart to the liquid fuel not only energy resulting from the centrifugal movement thereof radially outwardly but to impart an additional energy to said fuel as the same is moved by said impeller which additional energy taken together with the energy resulting from the centrifugal action accounts for a marked increase in the efficiency of said pump.

It is a still more specific object to provide an improved and novel centrifugal pump impeller effective in cooperation with the opposed housing wall about the inlet terminal to produce two forms of movement in the particles of liquid being handled thereby including first, a spiral movement from the center radially outwardly and secondly, a rotating helical movement about said general spiral path as an axis of rotation.

Other and more particular objects, advantages and uses of my invention will become apparent from a reading of the following specification taken in connection with the accompanying drawings which form a part thereof and wherein:

tion disclosing an arrangement in accordance with a preferred embodiment of my invention;

Fig. 2 is a cross-section view taken substantially on line 2—2 of Fig. 1 showing to advantage the arrangement of the straightener guide assembly;

Fig. 3 is an enlarged view of the principal portion of the structure of Fig. 1 with certain of the less essential elements broken away for clarity;

Fig. 4 is a plan view of the preferred form of my impeller;

Fig. 5 is a cross-section view taken substantially on the line 5—5 of Fig. 4 with parts broken away and showing to advantage the shape of the channel between successive vanes when developed into a flat plane, the section being taken on the curved line as indicated;

Fig. 6 is a view corresponding to Fig. 5 but showing an alternative form of impeller embodying my invention;

Fig. 7 shows a set of comparison curves bringing out the relative saving in amperes input as well as increase in discharge pressure obtained by use of my impeller as compared to the previously employed straight-sided vane form; and Fig. 8 presents a set of curves converting the information of Fig. 7 to a percentage basis and bringing out percentage increase in pressure differential obtained as well as the percentage decrease in amperes required to operate the pump.

Referring in greater detail to the figures of the drawings, my invention, in the more comprehensive aspect thereof, comprises a centrifugal booster pump housing 10 having a converging axially disposed inlet mouth or throat 11, a vapor ejecting propeller-like beater 12 positioned for rotation in axially opposed relation to the large inlet terminal end 13 of said converging mouth 11, by a connecting stem 15 supported by a rotary centrifugal impeller 14, received in the housing in axially opposed relation to the converged terminal 17 of said mouth. The housing 10 about the converged inlet terminal 17 is especially formed for cooperation with specially formed spirally extending vanes 18 and channels 19 therebetween formed in the impeller. These spirally extending channels are given a smooth curved cross-sectional contour, the open portions of these channels being in closely spaced relation to the stationary housing wall surface 22 surrounding the converged inlet mouth terminal 17 of the housing. The inner terminal ends 23 of the spiral vanes 18 lie substantially on a small circle spaced from a centrally disposed axially inner terminal ends form relatively sharp blade portions 27. In the more specific aspects of my invention these blade portions are inclined outwardly from this small circle at an angle to the axis of the impeller. This angle may be varied. However, I have found that an inclination of from 30° to 60°, preferably about 45°, to the plane of the impeller produces very effective operation. Proceeding from this blade portion of the vanes spirally outward to the periphery of the impeller, the vanes 18 become of increasing cross-section. The channel 19 formed between successive vanes is substantially uniform in cross-sectional contour having a generally fishhook-like shape, defined by a first substantially straight wall 28 forming the leading surface of a trailing vane, a forward substantially straight wall 29 forming the trailing surface of the adjacent leading vane, these two walls being inclined forwardly with respect to the plane of the impeller and its direction of rotation and being joined by a smooth, curved surface or bottom wall 30. As will appear, the principal significance of this curved cross-sectional contour is that the same presents no abrupt changes in direction but offers a smooth path for the movement thereover of liquid in the manner to be described.

When the impeller 14 is rotated in the clockwise direction looking at the same from the inlet end 15 of the axially disposed mouth 11, it will be seen that the inwardly disposed relatively sharp blade portions 27 of the vanes cut into the column of fuel presented within the confines of said blades with considerable impact. The liquid enters at right angles to the general plane of the impeller and must make a right angle turn in entering the channels 19 between successive vanes. The inlet velocity of the liquid is very low and the impact therewith of the vanes, particularly the blade portions 27, results in a release of such vapor bubbles as may have gotten past the propeller-like beater 12. The result is that these released air bubbles are given an additional opportunity to rise back through inlet mouth 11 into the fuel tank before the same enter the vane channels 19. The particles of air freed liquid are thrown radially outward along the channels in a spiral path and discharged into the surrounding scroll or volute chamber 33 formed in the pump housing 10 about the periphery of the impeller 14. This centrifugal effect imparts driving energy or pressure to the liquid delivered into the scroll.

In addition to the above centrifugal effect, it is desired to draw particular attention to a second important action that also takes place in the operation of my pump. As the particles of liquid receive the impact of the blade portion 27 of the vanes, these liquid particles are introduced into contact with the curved cross-sectional contour of the channels 19 with the result that the body of liquid contained in a channel not only moves radially outward in a spiral path but, in addition thereto, the same swirls or rotates in a helical-like manner about an axis extending along said spiral channel as indicated by arrows in Fig. 5. The fishhook-like cross-sectional contour of the spiral channel defines a portion of the path for the helical rotation of the liquid, while the opposed surface 22 of the housing adjacent the open portion of the channel 19 defines the remainder of this path. The vanes 18 have a substantially flat top surface 37, defined by a sharp convex leading edge and a concave trailing edge, which diverges in width from the inner ends of said vanes at the upper extremity of the blade portion 27 radially and spirally outwardly to the periphery of the impeller where it has its maximum width. This results in the open portion of the channel 19 adjacent housing surface 22 being of substantially the same cross-sectional width throughout. The vanes 18 extend spirally outwardly in a counter-clockwise direction with each vane lying within a 60° segment of the impeller, as will be apparent from Figure 4. The flat surfaces 37 of the vanes all lie in substantially the same plane and are positioned close to but spaced from the opposed housing surface 22 with a portion of each vane extending radially inwardly of the terminal 17 of inlet mouth 11. In the production structures now in operation and conforming with the present preferred disclosure the spacing between vane surfaces 37 and housing surface 22 is of the order of 0.002"±.0005 as it is desirable to make the surfaces 22, 28, 29 and 30 defining the path of the helical rotation as continuous as practicable. It is important to note that the rotation of the impeller in a clockwise direction relative to the opposed stationary wall surface opposite the open portion of the channel results in the friction of the opposed wall with the liquid contained in the channel producing a rotational effect upon the liquid, this rotation being, as above-described, of a helical character and about the general axis of the cross-sectional contour of the channel. This helical rotation about the channel axis is appreciable. It is estimated that a particle of fuel taken into a channel at the blade terminal of a vane will rotate a number of times in a helical path about said channel of the order of three to nine rotations before being discharged at the outer terminal end of the channel into the surrounding scroll or volute chamber. This rotation of the body of fuel within the channel imparts thereto an additional energy which greatly improves the efficiency and effectiveness of operation of the pump. It should be pointed out that this improvement in booster pump operation is greater than can be attributed to the simple addition of the centrifugal effect and the rotational effect. This would lead to the conclusion that there is some novel composite effect responsible for this unexpected improvement.

While I do not wish to be committed to any particular theory, it would appear that one logical explanation of this improved performance is based on the fact that the centrifugal force is equal to $V^2/R$ where V is the velocity and R is the radius. From this equation it is evident that the force will be higher with constant velocity if the radius is decreased. With the helical flow through the passages of the present impeller structure, the radius of the helix is very small, and hence this would appear to account for the improved results.

For example, it is found that for a given maximum boost in pressure between the pump inlet and pump outlet, the same can be accomplished with a marked reduction in power input to the impeller while, at the same time, this increase in pressure boost is not accompanied by the increase in vapor inclusion that would normally be expected to be present with the additional turbulence associated with the above described rotation of the liquid. While I do not attempt to completely explain this phenomenon, it would appear that several factors present contribute to this important result.

With reference first to the ejection of vapor, the blade portion of the vanes engage the liquid entering at right angles to the general plane of the impeller with an appreciable impact. This impact, as above noted, is believed to produce a localized pressure area on the fuel particles contacted with the result that any vapor present tends to separate and rise through the converged mouth and into contact with the rotating propeller-like beater 12 with the result that these vapor particles are caused to rise back into the tank 38 before the same have an opportunity to enter the spiral channels 19 of the impeller. Another important factor which appears to enter very definitely into this improved operation is the smooth curved cross-sectional contour 28, 29, 30 of the channels between the vanes 19, the absence of sharp abrupt changes in this contour appearing to greatly facilitate the helical-like rotation of the body of liquid and the imparting thereto of the additional energy over and above that attributable alone to the centrifugal effect.

In order to prevent undue swirling or rotating of the fuel being introduced about the axis of the beater 12 within the inlet mouth 11, I propose to employ a straightener vane assembly 46, having axially extending sheet metal straightener walls 47 fastened within the mouth 11 and extending in a general parallel direction to the axis of rotation of the beater 12. It will be apparent that since the straightener wall guide assembly divides the total column of flow up into several separate parts that the same is thus prevented from completely rotating about the mouth 11 as the same passes therethrough.

In addition to the above, the pump assembly will include the necessary elements required to make the same complete, but, since these cooperate in no new manner such as to form a part of the present invention, the same will not be described in detail. Such additional elements preferably include a liquid fuel and vapor guide 42 positioned at the pump inlet in opposed relation to the propeller 12 and functioning to introduce liquid fuel centrally of said propeller into the converging mouth 11 and effective to guide the air bubbles separated by the propeller upwardly and outwardly about the external periphery of the guide as indicated by the arrows. The pump may be attached to the associated fuel tank by means of perforated flanges and suitable bolts 43. In addition, the usual electric motor 44 may be provided for rotating the pump impeller and propeller. The scroll discharges into the usual outlet 45 which is arranged to be connected with a fuel line leading to a point of consumption such as a carburetor, not shown. There is provided also the necessary outer terminal screen 48 through which the fuel passes in entering the inlet mouth 11 and the side screen 49 through which the returned air bubbles pass when ejected beyond the tips of the rotary beater 12.

Referring to Figs. 7 and 8, the curves therein presented show the actual comparison between the performance of a standard production pump incorporating the above-described arrangement, including the particular construction of impeller, with the performance of a corresponding production pump incorporating the previously employed straight-sided spiral vaned impeller not providing for the additional helical-like rotation of the liquid, as the same progresses spirally outwardly into the scroll. Referring to Fig. 7, fuel flow in gallons per hour has been plotted against fuel discharge pressure in pounds per square inch for both the old pump and the present improved construction. In addition, a second set of curves show fuel flow in gallons per hour, plotted against motor amperes at twenty-five volts. Comparison of these first curves show, for example, that at three hundred gallons per hour the old straight-sided vane pump construction revealed a boosted pressure of 16.6 pounds per square inch, while under the same conditions the improved construction revealed a boosted pressure of 24 pounds per square inch. Referring to the second set of curves it is noted that for this same flow the motor driving the improved impeller draws only thirteen amperes while the motor driving the old straight-sided vane impeller under the same conditions draws fourteen amperes. Thus there is a saving of one ampere and an increase of booster pressure of roughly seven pounds per square inch.

Turning to Fig. 8, the information contained on the curves of Fig. 7 have been reduced to percentages to somewhat more clearly indicate the marked improvement in the operation of my pump. In the lower portion of this figure, fuel flow in gallons per hour is plotted against increase in pressure in percent obtained by the use of my combination spiral and helical flow impeller, over that obtained by the use of the old straight-sided spiral vane impeller. In the second curve flow in gallons per hour is plotted against decrease in ampere flow in percent, likewise bringing out the comparison and the saving in current by the use of my improved combination spiral helical flow impeller, over that realized from the old straight-sided helical vaned impeller. Examining the two curves together, it is again noted that at three hundred gallons per hour flow there is an increase in pressure boost of between 30 and 40%, while at the same time there is realized a saving of between 10 and 15% in the current flow, other conditions being maintained the same for both pumps.

While I have disclosed a channel of a general fishhook-like cross-sectional contour with the major axis of the curve inclining forward in the general direction of clockwise rotation and prefer this form because of the novel and improved operating results flowing therefrom, I nevertheless contemplate other alternative channel shapes as coming within the broader aspects of my invention. Referring to Fig. 6, there is illustrated one such alternative form or shape of channel cross-section 50. This channel 50 is generally circular in cross-sectional contour, being open adjacent the stationary housing 22 for a selected number of degrees for the above-explained purpose of effecting frictional contact between the body of liquid in the channel and the stationary surface for imparting additional rotational energy to the body of fuel.

While I have disclosed my invention in connection with a centrifugal booster pump for moving volatile fuel, and contemplate its use in particular in this connection because of the above novel relationships, I nevertheless contemplate other uses as coming within the broader aspects of my invention. For example, I have determined that a centrifugal pump for moving oil shows a very much improved performance when my particular form of impeller is incorporated therein in place of other available forms of impellers.

Therefore, I do not wish to have my invention, in the broader aspects thereof, limited to any particular application, but it is my intention that the same should be defined by the appended claims.

I claim:

1. In a centrifugal booster pump for handling volatile liquid fuel at widely differing altitudes, including means defining a pump housing having an impeller chamber therein, an axially disposed converging inlet mouth leading to said chamber, a vapor ejecting propeller-like beater positioned axially adjacent the large inlet end of said converging inlet mouth, a centrifugal impeller positioned within said chamber, supporting means extending axially between said propeller and impeller connecting the same in driving relation, said housing having a wall surface surrounding the periphery of said converged inlet mouth on the impeller chamber side thereof and spaced in closely adjacent relation to said impeller, said impeller being formed with a plurality of spaced spiral vanes extending in an axial direction from the body of said impeller and having leading and trailing edges lying in substantially a common plane and having spiral channels formed between successive vanes, said channels being open adjacent said wall surface and having a smooth curved transverse cross-sectional contour whereby the liquid entering said channel is thrown radially outwardly by the centrifugal force and whereby in addition the liquid in said channel is frictionally engaged with the wall surface confronting the open side of said channels and is caused to swirl or rotate about the general axis of said channel as the axis of rotation to thus produce a boosted pressure that is a composite result of said centrifugal effect and said rotational effect on said liquid.

2. In a centrifugal booster pump assembly for handling volatile liquid fuel at widely differing altitudes, including means defining a housing having an impeller chamber, an axially disposed circular cross-section converging inlet mouth leading to said chamber, and adapted to be placed in submerged relation to a body of said liquid, a centrifugal impeller received in said chamber, said impeller having a plurality of vanes thereon facing said converged inlet mouth and extending from a small circle located radially inwardly of the inner periphery of said circular inlet mouth spirally outwardly in a counterclockwise direction terminating at the periphery of said impeller within approximately a 60° segment thereof, a scroll located radially outwardly in said housing adjacent the periphery of said impeller for receiving the discharge therefrom, a radially extending housing wall surface located between the inner terminal portion of said inlet mouth in closely spaced relation with reference to the extremities of said vanes, the inner entrance terminal portion of each vane being in the form of a relatively sharp blade, said vanes increasing in transverse cross-section proceeding spirally outwardly and remaining substantially of the same axial depth, the leading wall surface of each blade being at least in part concave transversely and the trailing wall surface being at least in part concave transversely, the two opposed wall surfaces of adjacent vanes terminating in substantially a common plane and defining an open channel between successive vanes, the general cross-sectional contour of said channels being fishhook-like, whereby the liquid presented centrally of said impeller is impacted by said relatively sharp blades upon the rotation of said impeller and said liquid is moved into said channel, said impact by said blades being effective to cause occluded air bubbles to rise upwardly into the path of said propeller-like beater and moved radially outwardly thereby out of the path of the incoming liquid and thence upwardly through the body of liquid, said stationary radially extending wall being effective to frictionally contact the liquid at the open side of said channels and to cause said liquid received between the extremities of said channels to rotate in said channels in a generally helical-like path while it is being moved outwardly along said spiral channels by the centrifugal effect of rotation of said impeller, said liquid being discharged into said scroll with the combined energy of centrifugal force and the force of said helical-like rotation.

3. In a centrifugal booster pump for handling liquid, including means defining a housing having an impeller chamber therein, an axially disposed converging inlet mouth leading to said chamber, a radially outwardly extending housing wall surrounding the inner terminal portion of said mouth, a generally disc-like centrifugal impeller wheel axially received within said chamber in closely spaced relation with reference to said radially extending wall, said impeller being formed with a plurality of symmetrically spaced spiral vanes extending from a position radially inwardly of the periphery of said mouth outwardly to the periphery of said impeller, spiral channels defined between successive vanes and having a smooth curved transverse cross-section, the leading wall surface of each vane being transversely concave at least in part and the trailing wall surface of each vane being transversely concave at least in part, these channels being open wide adjacent said radially extending wall with the surfaces of the vanes between said channels lying in a substantially common plane, the rotation of said impeller in a clockwise direction being effective to move liquid along said spiral channel and impart a centrifugal force effect thereto, the friction between the liquid in said channel and said stationary radially extending wall as said propeller is rotated being effective to cause the liquid contained in said channel to swirl or rotate in a generally helical path within said channel as the same is moved radially outward thus producing a boosted pressure which is a composite of the centrifugal effect and the rotational effect.

4. In a fluid impeller for centrifugal pumps including means provided with a plurality of vanes having spirally directed channels therebetween for the centrifugal outward movement of liquid by the rotation of said impeller, each of said channels being open along one side throughout the spiral extent thereof with the edges of the vanes at the open side of said channels being spaced apart a substantial distance and lying in a substantially common plane, said channels being defined in transverse cross-section throughout by bounding lines all of which are smooth curves free from abrupt changes in curvature, said curves being entirely non-convex in shape.

5. In a centrifugal pump including means defining a housing having an impeller chamber therein provided with a coaxial inlet mouth leading into said chamber and a peripheral discharge receiving volute chamber, means defining a centrifugal impeller coaxially positioned within said chamber for receiving fluid through said mouth and discharging the same into said volute chamber, said impeller defining means including a plurality of spirally extending vanes, the leading surface of each vane and the opposed trailing surface of the adjacent vane being spaced a substantial distance apart and lying in a substantially common plane defining spirally extending channels between said vanes, all transverse cross-sectional contours of said channels being defined by smooth curves, each of said channels being open on the side thereof facing said inlet mouth for a first portion of the spiral extent thereof to expose the same to impact with a supply of fluid introduced through said inlet mouth, said housing having a transversely extending wall surface in closely spaced opposed relation to a second radially outwardly spaced open portion of said impeller channels, whereby the liquid entering said channels is moved radially outwardly along said channels by the centrifugal force produced by rotation of said impeller and whereby in addition the fluid in said channels is frictionally engaged with the housing wall surface confronting the open side of said channels and is caused to swirl or rotate helically about the general axis of said channels within said second radially outwardly spaced portion thereof opposite said transversely extending housing wall surface to thus produce an increase in the pressure of the fluid discharged into said volute chamber.

6. In a centrifugal pump including means defining a housing having an impeller chamber therein provided with a coaxial inlet mouth leading into said chamber and a peripheral discharge receiving volute chamber; means defining a centrifugal impeller coaxially positioned within said chamber for receiving liquid through said mouth and discharging the same into said volute chamber, said impeller defining means including a plurality of symmetrically spaced spirally extending vanes leading from adjacent the center of said impeller to the periphery thereof, each of said vanes being defined at least in part by a leading transversely concave wall surface and by a trailing transversely concave wall surface, said leading and trailing wall surfaces terminating in longitudinal edges spaced apart a substantial distance and lying in a substantially common plane, the successive spaces between successive vanes forming spirally extending liquid channels, all transverse cross-sectional contours of said channels providing for smooth flow of liquid in a helical-like path about the general axis of said channels, each of said channels being open on the side thereof facing said inlet mouth for a first portion of the spiral extent thereof to expose the same to contact with a supply of liquid introduced through said inlet mouth, said housing having a transversely extending wall surface in closely spaced opposed relation to a second spirally outwardly spaced open portion of said impeller channels.

7. In a centrifugal pump including means defining a housing having an impeller chamber therein provided with a coaxial inlet mouth leading into said chamber and a peripheral discharge receiving volute chamber; means defining a centrifugal impeller coaxially positioned within said chamber for receiving fluid through said mouth and discharging the same into said volute chamber, said impeller defining means including a plurality of symmetrically spaced vanes extending from a position adjacent the axis of said impeller spirally outwardly, said housing having a wall surface in closely spaced confronting relation to said vanes, the transverse cross-sectional area of each of said vanes increasing proceeding spirally outwardly from the inner terminals thereof, the leading wall surface of each vane being concave in shape at least in part and the trailing wall surface of each vane being concave at least in part, said leading and trailing wall surfaces terminating in longitudinal edges spaced apart a substantial distance and lying in a substantially common plane, whereby there is defined between each succeeding vane a flow channel providing for the smooth flow of liquid both spirally outwardly as well as helically about the general axis of said channels.

8. In a centrifugal pump including means defining a housing having an impeller chamber therein provided with a coaxial inlet mouth leading into said chamber and a peripheral discharge receiving volute chamber; means defining a centrifugal impeller coaxially positioned within said chamber for receiving liquid through said mouth and discharging the same into said volute chamber, said impeller defining means including a plurality of vanes thereon extending spirally outwardly from a position adjacent the axis of said impeller, the leading surface defining portion of each vane and the opposed trailing surface defining portion of the adjacent vane forming a corresponding spirally extending channel, all of the transverse cross-sections of said channel throughout the spiral extent thereof being bounded by lines all of which are smooth curves free from abrupt changes in curvature, said curves being entirely non-convex in shape, each of said channels including longitudinal edges spaced apart a substantial distance and lying in a substantially common plane, thus providing channels open for the full length thereof on the side thereof facing said inlet mouth, each of said channels having a first portion of the spiral extent thereof exposed for impact with a supply of liquid introduced through said inlet mouth, said housing being further provided with a transversely extending wall surface in closely spaced opposed relation to a second spiral portion of said impeller channels for cooperation therewith to define the flow path of liquid upon the rotation of said impeller.

9. In a centrifugal pump including means defining a housing having an impeller chamber therein provided with a coaxial inlet mouth leading into said chamber and a peripheral receiving volute chamber; means defining a centrifugal impeller coaxially positioned within said chamber for receiving liquid through said inlet mouth and discharging the same into said volute chamber, said impeller defining means including a plurality of symmetrically spaced vanes protruding axially from said impeller and extending from a position adjacent the axis thereof spirally outwardly, said housing having a wall arranged in closely spaced relation to said vanes, the leading portion of each of said vanes being defined at least in part by a concave surface and the opposed trailing portion of said adjacent vane being defined at least in part by a concave surface, said surfaces forming symmetric channels for the flow of liquid between each of said succeeding vanes with the longitudinal edges of said surfaces spaced apart a substantial distance and lying in a substantially common plane, the transverse cross-sectional area of each of said vanes increasing proceeding spirally outwardly of the inner terminal thereof whereby to maintain the transverse cross-section area of said channels substantially uniform proceeding spirally outwardly from the inner terminal thereof.

10. In a centrifugal pump including means defining a housing having an impeller chamber therein provided with a coaxial inlet mouth and a peripheral discharge receiving volute chamber;

means defining a centrifugal impeller coaxially positioned for rotation within said chamber for receiving liquid through said mouth in contact with the central portion of said impeller and discharging the same into said volute chamber, said impeller defining means including a plurality of symmetrically spaced vanes protruding axially from said impeller and extending spirally outwardly from a position adjacent the axis of said impeller, said housing having a wall arranged in closely spaced relation to said vanes, the transverse cross-sectional contours of each of said vanes being defined by smooth non-convex curves, the axial terminal surface of each of said vanes being substantially flat and transverse to the axis of said impeller with the terminal surfaces of adjacent vanes spaced apart a substantial distance and all lying in a substantially common plane, the transverse dimension each of said terminal surfaces increasing in value proceeding spirally outwardly, the same having a minimum value at the inner terminal of said vane and a maximum value at the outer terminal thereof.

11. A centrifugal pump, including: a housing having an impeller chamber formed therein and having a wall defining a coaxial inlet passage leading into said chamber, said impeller chamber being volute and defined in part by a transverse wall surrounding the inner end of said inlet passage; and a rotatable centrifugal impeller coaxially positioned within said volute chamber for receiving liquid from said inlet passage and discharging the same into said volute chamber, said impeller being substantially circular and having one side thereof disposed in closely spaced relation to said transverse wall, said one side of said impeller being provided with a plurality of spirally extending channels, said channels being separated by spirally extending vanes, spaced a substantial distance apart and lying in a substantially common plane said spiral vanes and channels including outer portions confronting said transverse wall and inner portions extending to a point inwardly of the wall defining said inlet passage so that the liquid introduced through said inlet passage and entering the channels in said impeller is subjected to the impact of said impeller vanes, each of said vanes having a transverse cross-section that increases in area in a direction outwardly from the axis of said impeller, each of said spiral channels being defined in part by trailing and leading side wall vane surfaces joined at their inner ends by a smooth, curved bottom wall surface, whereby the liquid from said inlet passage entering said spiral channels at the inner portions thereof is forced radially outwardly along said channels by the centrifugal force produced by rotation of said impeller and whereby the portions of said spiral channels confronting said transverse wall cooperate with said transverse wall to cause the liquid in said spiral channels to be frictionally engaged by said transverse wall and swirl or rotate helically about an axis extending longitudinally of said spiral channels to thus produce an increase in the pressure of the liquid discharged into said volute chamber.

12. A fluid impeller for centrifugal pumps, comprising: a substantially circular member having one side thereof provided with a plurality of spirally extending channels, said channels being separated by spirally extending vanes, each of said vanes having a transverse cross-section that increases in area in a direction outwardly from the axis of said impeller and including leading and trailing edges lying in a substantially common plane with the leading edge of one vane and the trailing edge of the adjacent vane spaced a substantial distance apart, each of said spiral channels being defined in part by trailing and leading wall vane surfaces joined at their inner ends by a smooth, curved bottom wall surface.

13. A centrifugal pump, including: a housing having an impeller chamber formed therein and having a wall defining a coaxial inlet passage leading into said chamber, said impeller chamber being volute and defined in part by a transverse wall surrounding the inner end of said inlet passage; and a rotatable centrifugal impeller coaxially positioned within said volute chamber for receiving liquid from said inlet passage and discharging the same into said volute chamber, said impeller being substantially circular and having one side thereof disposed in closely spaced relation to said transverse wall, said one side of said impeller being provided with a plurality of spirally extending channels, said channels being separated by spirally extending vanes, said spiral vanes and channels including portions confronting said transverse wall and inner portions extending to a point inwardly of the wall defining said inlet passage so that the liquid introduced through said inlet passage and entering the channels in said impeller is subjected to the impact of said impeller vanes, each of said vanes having a transverse cross-section that increases in area in a direction outwardly from the axis of said impeller, each of said spiral channels being defined in part by trailing and leading side wall vane surfaces inclined with respect to the plane of said impeller and extending outwardly in the general direction in which the impeller is rotated in use, said inclined side wall surfaces terminating at their outer ends in longitudinal edges spaced a substantial distance apart and lying in a substantially common plane and being joined at their inner ends by a smooth, curved bottom wall surface, whereby the liquid from said inlet passage entering said spiral channels at the inner portions thereof is forced radially outwardly along said channels by the centrifugal force produced by rotation of said impeller and whereby the liquid in the portions of said spiral channels confronting said transverse wall is frictionally engaged with said transverse wall and caused to swirl or rotate helically in said spiral channels about an axis extending longitudinally of said spiral channels to thus produce an increase in the pressure of the liquid discharged into said volute chamber.

14. A fluid impeller for centrifugal pumps, comprising: a substantially circular member having one side thereof provided with a plurality of spirally extending channels, said channels being separated by spirally extending vanes, each of said vanes having a transverse cross-section that increases in area in a direction outwardly from the axis of said impeller, each of said spiral channels being defined in part by trailing and leading side wall vane surfaces inclined with respect to the plane of said impeller and extending outwardly in the general direction in which the impeller is rotated in use, said inclined side wall surfaces terminating at their outer ends in longitudinal edges spaced a substantial distance apart and lying in a substantially common plane and being joined at their inner ends by a smooth, curved bottom wall surface.

15. A fluid impeller for centrifugal pumps, comprising: a substantially circular disc having at least one flat side face, said flat side face having a plurality of spirally extending channels formed therein, said channels being separated by spirally extending vanes, the leading edge of each vane being sharp and convex and the trailing edge of each vane being concave and arranged so that the leading and trailing edges of each vane diverge outwardly, each of said vanes having such cross-sectional shape that said spiral channels are of substantially uniform transverse cross-sectional area, each of said spiral channels being defined in part by trailing and leading side wall vane surfaces inclined with respect to the axis of said impeller and outwardly in the direction in which the impeller is rotated in use, said side inclined wall surfaces being joined at their inner ends by a smooth, curved bottom wall surface.

16. A fluid impeller for centrifugal pumps, comprising: a substantially circular disc having at least one flat side face, said flat side face having a plurality of spirally extending channels formed therein, said channels being separated by spirally extending vanes, the leading edge of each vane being sharp and convex and the trailing edge of each vane being concave and arranged so that the leading and trailing edges of each vane diverge outwardly, each of said vanes having such cross-sectional shape that said spiral channels are of substantially uniform transverse cross-sectional area, each of said spiral channels being defined in part by concave trailing and leading side wall vane surfaces, said concave side wall vane surfaces terminating at their outer ends in edges spaced apart a substantial distance circumferentially and lying in a substantially common plane and being joined at their inner ends by a smooth, curved bottom wall surface.

17. In a centrifugal pump including means defining a housing having an impeller chamber therein with an axial inlet mouth to said chamber and a peripheral scroll in communication with said chamber, for receiving fuel to be discharged from an impeller, a centrifugal impeller positioned within said chamber in axial relation to said inlet, said impeller being formed with a plurality of symmetrically spaced spirally extending liquid impeller vanes, said spirally extending impeller vanes having leading and trailing edges lying in substantially a common plane and being shaped to provide liquid receiving spiral channels therebetween open at one face of said impeller and having a smooth curved transverse cross-sectional contour with the edges defining said channels spaced a substantial distance apart, said housing having a wall surface surrounding said inlet mouth in closely spaced opposed relation to said impeller vanes, whereby the liquid entering said channels is thrown radially outwardly by the centrifugal force produced by rotation of said impeller and whereby in addition the liquid in said channels is frictionally engaged with the wall surface confronting the open side of said channels and is caused to swirl or rotate about the general axis of said channel as the axis of rotation to thus produce a boosted pressure that is a composite result of said centrifugal effect and said rotational effect on said liquid.

18. A centrifugal liquid pump comprising: a housing having an impeller chamber and an inlet communicating with said impeller chamber; and a centrifugal impeller in said impeller chamber, said impeller having outwardly extending open channels formed in one face thereof and communicating at their inner ends with said inlet, said housing having a wall surface in closely spaced relation to said one face of said impeller, each of said channels including a curved bottom wall and having longitudinal upper edges disposed in a common plane and spaced a substantial distance apart, said housing having an outlet for receiving liquid from the outer ends of said channels.

HARRY H. HARPSTER.

Certificate of Correction

Patent No. 2,402,398.   June 18, 1946.

HARRY H. HARPSTER

It is hereby certified that errors appear in the printed specification of the above numbered patent requiring correction as follows: Column 9, line 1, claim 5, after the word "plane" insert *and*; column 11, line 39, claim 11, after "vanes" strike out the comma and insert the same in line 41, same claim, after "plane"; and that the said Letters Patent should be read with these corrections therein that the same may conform to the record of the case in the Patent Office.

Signed and sealed this 17th day of September, A. D. 1946.

[SEAL]

LESLIE FRAZER,
*First Assistant Commissioner of Patents.* prising: a substantially circular disc having at least one flat side face, said flat side face having a plurality of spirally extending channels formed therein, said channels being separated by spirally extending vanes, the leading edge of each vane being sharp and convex and the trailing edge of each vane being concave and arranged so that the leading and trailing edges of each vane diverge outwardly, each of said vanes having such cross-sectional shape that said spiral channels are of substantially uniform transverse cross-sectional area, each of said spiral channels being defined in part by trailing and leading side wall vane surfaces inclined with respect to the axis of said impeller and outwardly in the direction in which the impeller is rotated in use, said side inclined wall surfaces being joined at their inner ends by a smooth, curved bottom wall surface.

16. A fluid impeller for centrifugal pumps, comprising: a substantially circular disc having at least one flat side face, said flat side face having a plurality of spirally extending channels formed therein, said channels being separated by spirally extending vanes, the leading edge of each vane being sharp and convex and the trailing edge of each vane being concave and arranged so that the leading and trailing edges of each vane diverge outwardly, each of said vanes having such cross-sectional shape that said spiral channels are of substantially uniform transverse cross-sectional area, each of said spiral channels being defined in part by concave trailing and leading side wall vane surfaces, said concave side wall vane surfaces terminating at their outer ends in edges spaced apart a substantial distance circumferentially and lying in a substantially common plane and being joined at their inner ends by a smooth, curved bottom wall surface.

17. In a centrifugal pump including means defining a housing having an impeller chamber therein with an axial inlet mouth to said chamber and a peripheral scroll in communication with said chamber, for receiving fuel to be discharged from an impeller, a centrifugal impeller positioned within said chamber in axial relation to said inlet, said impeller being formed with a plurality of symmetrically spaced spirally extending liquid impeller vanes, said spirally extending impeller vanes having leading and trailing edges lying in substantially a common plane and being shaped to provide liquid receiving spiral channels therebetween open at one face of said impeller and having a smooth curved transverse cross-sectional contour with the edges defining said channels spaced a substantial distance apart, said housing having a wall surface surrounding said inlet mouth in closely spaced opposed relation to said impeller vanes, whereby the liquid entering said channels is thrown radially outwardly by the centrifugal force produced by rotation of said impeller and whereby in addition the liquid in said channels is frictionally engaged with the wall surface confronting the open side of said channels and is caused to swirl or rotate about the general axis of said channel as the axis of rotation to thus produce a boosted pressure that is a composite result of said centrifugal effect and said rotational effect on said liquid.

18. A centrifugal liquid pump comprising: a housing having an impeller chamber and an inlet communicating with said impeller chamber; and a centrifugal impeller in said impeller chamber, said impeller having outwardly extending open channels formed in one face thereof and communicating at their inner ends with said inlet, said housing having a wall surface in closely spaced relation to said one face of said impeller, each of said channels including a curved bottom wall and having longitudinal upper edges disposed in a common plane and spaced a substantial distance apart, said housing having an outlet for receiving liquid from the outer ends of said channels.

HARRY H. HARPSTER.

---

Certificate of Correction

Patent No. 2,402,398.                      June 18, 1946.

HARRY H. HARPSTER

It is hereby certified that errors appear in the printed specification of the above numbered patent requiring correction as follows: Column 9, line 1, claim 5, after the word "plane" insert *and*; column 11, line 39, claim 11, after "vanes" strike out the comma and insert the same in line 41, same claim, after "plane"; and that the said Letters Patent should be read with these corrections therein that the same may conform to the record of the case in the Patent Office.

Signed and sealed this 17th day of September, A. D. 1946.

[SEAL]

LESLIE FRAZER,
*First Assistant Commissioner of Patents.*